(12) United States Patent
Tripathi et al.

(10) Patent No.: US 11,082,673 B2
(45) Date of Patent: *Aug. 3, 2021

(54) PROJECTING IMAGES AND VIDEOS ONTO ENGINEERED CURVED SURFACES

(71) Applicant: THE BOEING COMPANY, Chicago, IL (US)

(72) Inventors: Shubham Tripathi, Bangalore (IN); Kapaleeswaran Viswanathan, Bangalore (IN); Arun Ayyagari, King, WA (US)

(73) Assignee: THE BOEING COMPANY, Chicago, IL (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/575,639

(22) Filed: Sep. 19, 2019

(65) Prior Publication Data
US 2020/0014896 A1 Jan. 9, 2020

Related U.S. Application Data

(63) Continuation of application No. 15/972,942, filed on May 7, 2018, now Pat. No. 10,425,625.

(30) Foreign Application Priority Data

Feb. 6, 2018 (IN) .............................. 201811004436

(51) Int. Cl.
*H04N 9/31* (2006.01)
*G06T 3/00* (2006.01)

(52) U.S. Cl.
CPC ......... *H04N 9/3185* (2013.01); *G06T 3/0093* (2013.01); *H04N 9/3147* (2013.01)

(58) Field of Classification Search
CPC ... H04N 9/3185; H04N 9/3147; G06T 3/0093
See application file for complete search history.

(56) References Cited

U.S. PATENT DOCUMENTS

| 6,369,814 B1 | 4/2002 | Dorbie |
| 9,064,312 B2 | 6/2015 | Majumder et al. |

(Continued)

FOREIGN PATENT DOCUMENTS

| CA | 2464569 A1 | 10/2004 |
| EP | 2667615 A1 | 11/2013 |
| EP | 3136722 A2 | 3/2017 |

OTHER PUBLICATIONS

Zhen Lei, et. al., "A New Calibration Method of the Projector in Structured Light Measurement Technology," Procedia CIRP 27, pp. 303-308, 2015.

(Continued)

*Primary Examiner* — Michael E Teitelbaum
(74) *Attorney, Agent, or Firm* — Patterson + Sheridan, LLP

(57) ABSTRACT

Techniques for projecting images onto fabricated surfaces. One or more electronic files containing an engineering diagram that describes a three-dimensional shape of the fabricated surface are retrieved. Warp transformation information for transforming images to be projected onto the fabricated surface is calculated, based on the engineering diagram, positional information defining a three-dimensional position of a projection device, relative to the fabricated surface, and positional information of an intended viewer relative to the fabricated surface. The warp transformation information is applied to one or more images to generate one or more transformed images. Embodiments project, using the projection device, the one or more transformed images onto the fabricated surface.

20 Claims, 10 Drawing Sheets

(56) References Cited

U.S. PATENT DOCUMENTS

| | | | | |
|---|---|---|---|---|
| 2002/0035408 A1* | 3/2002 | Smith | ............... | G06F 17/5004 |
| | | | | 700/97 |
| 2009/0310100 A1* | 12/2009 | Kondo | ................. | G03B 17/48 |
| | | | | 353/122 |
| 2010/0123687 A1* | 5/2010 | Nagamine | ............ | G06F 3/0425 |
| | | | | 345/179 |
| 2013/0335451 A1* | 12/2013 | Tsuji | ...................... | G06T 5/006 |
| | | | | 345/647 |
| 2015/0281629 A1* | 10/2015 | Davies | ............... | H04N 9/3185 |
| | | | | 348/51 |
| 2017/0064294 A1 | 3/2017 | Priede | | |
| 2019/0246083 A1 | 8/2019 | Tripathi et al. | | |

OTHER PUBLICATIONS

Dawei Cai "Projector Correction Approach for Unknown Geometry Surface." WSEAS Transaction on Circuits and Systems vol. 2, No. 4 pp. 759-765 (Oct. 2003).

C. Xie, et. al., "Simple Auto-Geometric Correction for non-planer projection," International Conference on Automatic Control and Artificial Intelligence (ACAI 2012), Mar. 2012.

John Brosz, et. al., "Art and Nonlinear Projection," http://pages.cpsc.ucalgary.ca/~brosz/research/projection/bridges.pdf, 2009.

J. P. Tardif, S. Roy, M. Trudeau, "Multi-projectors for arbitrary surfaces without explicit calibration nor reconstruction", International Conference on 3-D Digital Imaging and Modeling, 2003.

European Patent Office European Search Report for Application No. 19154623.3 dated Nov. 7, 2019.

"Projector Simulation," [Accessed Jul. 24, 2019] www.d3technologies.com/features/projector_simulation.

\* cited by examiner

PROJECTING IMAGES AND VIDEOS ONTO ENGINEERED CURVED SURFACES

CROSS-REFERENCE TO RELATED APPLICATIONS

This application is a continuation of U.S. non-provisional application Ser. No. 15/972,942, filed on May 7, 2018, which claims benefit of Indian Provisional Application Number 201811004436, filed Feb. 6, 2018, both of which are herein incorporated by reference in their entireties.

FIELD

The present disclosure related to digital image projection, and more specifically, to techniques for modifying digital images for projection onto curved surfaces using engineering diagrams.

BACKGROUND

Image and video projection devices are used frequently today for a variety of purposes. Common applications of these devices include home entertainment (e.g., movie and television viewing), public entertainment (e.g. movie theaters), advertising (e.g. displaying image-based advertisements), and so on. As projection technology continues to improve and production costs continue to decrease, it is likely that the use of projection technology will become increasingly common.

Typically, projection devices are paired with projection surfaces which are optimized for viewing projected images or videos. Many such projection surfaces are flat or uniformly curved, to reduce any distortion in the projected images and videos perceived by viewers. Additionally, such surfaces are commonly white or grey in coloration to reduce any discoloration of the projected images or videos. While such optimized surfaces typically enhance the viewing experience, there are many instances where it would be desirable to make use of projection technology without the use of a conventional projection surface. For example, in areas where space is severely constrained (e.g., onboard an aircraft), it may be desirable to project images or videos in various locations where it is infeasible to mount a conventional projection screen. However, without the use of such an optimized projection surface, viewers may experience geometric and keystone distortion when viewing the projected images or videos, rendering the viewing experience less than optimal.

SUMMARY

According to one embodiment of the present invention a method includes receiving one or more electronic files containing an engineering diagram. The method also includes parsing the one or more electronic files to determine a plurality of parameters describing a three-dimensional shape of the surface and calculating warp transformation information for transforming images to be projected onto the surface, based on the determined plurality of parameters, positional information defining a three-dimensional position of a projection device, relative to the surface, and positional information of an intended viewer relative to the surface. Additionally, the method includes receiving one or more images to project onto the surface. The method further includes applying the warp transformation information to the one or more images to generate one or more transformed images. The method includes projecting, using the projection device, the one or more transformed images onto the surface.

In one aspect, in combination with any example above, the one or more images further comprise frames of video data.

In one aspect, in combination with any example above, calculating the warp transformation information for transforming images to be projected onto the surface, based on the determined plurality of parameters and first positional information defining a three-dimensional position of the projection device, relative to the surface, further includes simulating projection of a first image onto a virtual representation of the surface, based on the determined plurality of parameters and the first positional information defining the three-dimensional position of the projection device, relative to the surface.

In one aspect, in combination with any example above, calculating the warp transformation information for transforming images to be projected onto the surface, based on the determined plurality of parameters and first positional information defining a three-dimensional position of the projection device, relative to the surface, further includes mapping a plurality of points between the first image and a second image, wherein the second image comprises a simulated projection of the first image.

In one aspect, in combination with any example above, the engineering diagram further comprises a computer-aided design (CAD) file that defines a surface geometry of the surface.

In one aspect, in combination with any example above, the warp transformation information is applied to the one or more images to generate one or more transformed images in real-time using one or more graphics processing units (GPUs).

In one aspect, in combination with any example above, the one or more images further include frames of video data, and further comprising generating a digital file that is formatted according to a predefined video encoding standard, wherein the digital file contains at least a representation of the transformed images generated from the frames of video data.

In one aspect, in combination with any example above, the positional information further defines a pose and an orientation of the projection device.

In one aspect, in combination with any example above, the warp transformation information is applied to the one or more images to generate one or more transformed images, such that when the one or more transformed images are projected onto the surface using the projection device, the projected image is substantially similar in appearance to the one or more images when viewed from a location of the intended viewer.

In one aspect, in combination with any example above, the projection device further comprises a normal-throw projection device, and wherein the first positional information further comprises three-dimensional coordinates defining a center of a visible lens of the normal-throw projection device.

In one aspect, in combination with any example above, the first positional information is calculated using multiple different projector positions.

In one aspect, in combination with any example above, calculating warp transformation information for transforming images to be projected onto the surface is further based on generating a three-dimensional virtual representation of the surface, using the engineering diagram.

In one aspect, in combination with any example above, calculating warp transformation information for transforming images to be projected onto the surface, based on the determined plurality of parameters and first positional information defining a three-dimensional position of the projection device, relative to the surface further includes receiving a selection of a bounding box that corresponds to a rectangular portion of a camera plane, and calculating the warp transformation information, based on the bounding box selection and one or more generated bijective mappings relating to a projector plane for the projection device and the camera plan.

Another embodiment provides a projection system that includes one or more projection devices, a non-transitory computer-readable medium containing electronic data corresponding to one or more images to project onto a surface and warp transformation information for transforming images to be projected onto the surface. The warp transformation information is calculated based on a plurality of parameters describing a three-dimensional shape of the surface, first positional information defining one or more three-dimensional positions of the one or more projection device, relative to the surface, and second positional information of an intended viewer relative to the surface. The system further includes logic configured to parse one or more electronic files containing an engineering diagram, to determine the plurality of parameters describing the three-dimensional shape of the surface, to retrieve the electronic data corresponding to the one or more images to project onto the surface from the non-transitory computer-readable medium, to apply the warp transformation information to the one or more images to generate one or more transformed images, and to project, using the one or more projection devices, the one or more transformed images onto the surface.

In one aspect, in combination with any example above, the one or more images further comprise frames of video data.

In one aspect, in combination with any example above, the warp transformation information for transforming images to be projected onto the surface, is calculated by, at least in part, simulating projection of a first image onto a virtual representation of the surface, based on the determined plurality of parameters and the first positional information defining the three-dimensional position of the one or more projection devices, relative to the surface, and mapping a plurality of points between the first image and a second image, wherein the second image comprises a simulated projection of the first image.

In one aspect, in combination with any example above, the warp transformation information for transforming images to be projected onto the surface is further based on generating a three-dimensional virtual representation of the surface, using the engineering diagram.

In one aspect, in combination with any example above, the positional information further defines a pose and an orientation of the one or more projection devices, and the positional information defines a location of the intended viewer.

In one aspect, in combination with any example above, the warp transformation information is applied to the one or more images to generate one or more transformed images, such that when the one or more transformed images are projected onto the surface using the one or more projection devices, the projected image is substantially similar in appearance to the one or more images when viewed from the location of the intended viewer.

Another embodiment described herein provides a non-transitory computer-readable medium containing computer program code that, when executed by operation of one or more computer processors, performs an operation. The operation includes receiving one or more electronic files containing an engineering diagram relating to a surface and parsing the one or more electronic files to determine a plurality of parameters describing a three-dimensional shape of the surface. The operation further includes calculating warp transformation information for transforming images to be projected onto the surface, based on the determined plurality of parameters, first positional information defining a three-dimensional position of a projection device, relative to the surface, and second positional information of an intended viewer relative to the surface. The operation further includes receiving one or more images to project onto the surface, applying the warp transformation information to the one or more images to generate one or more transformed images, and projecting, using the projection device, the one or more transformed images onto the surface.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

Figure 1:
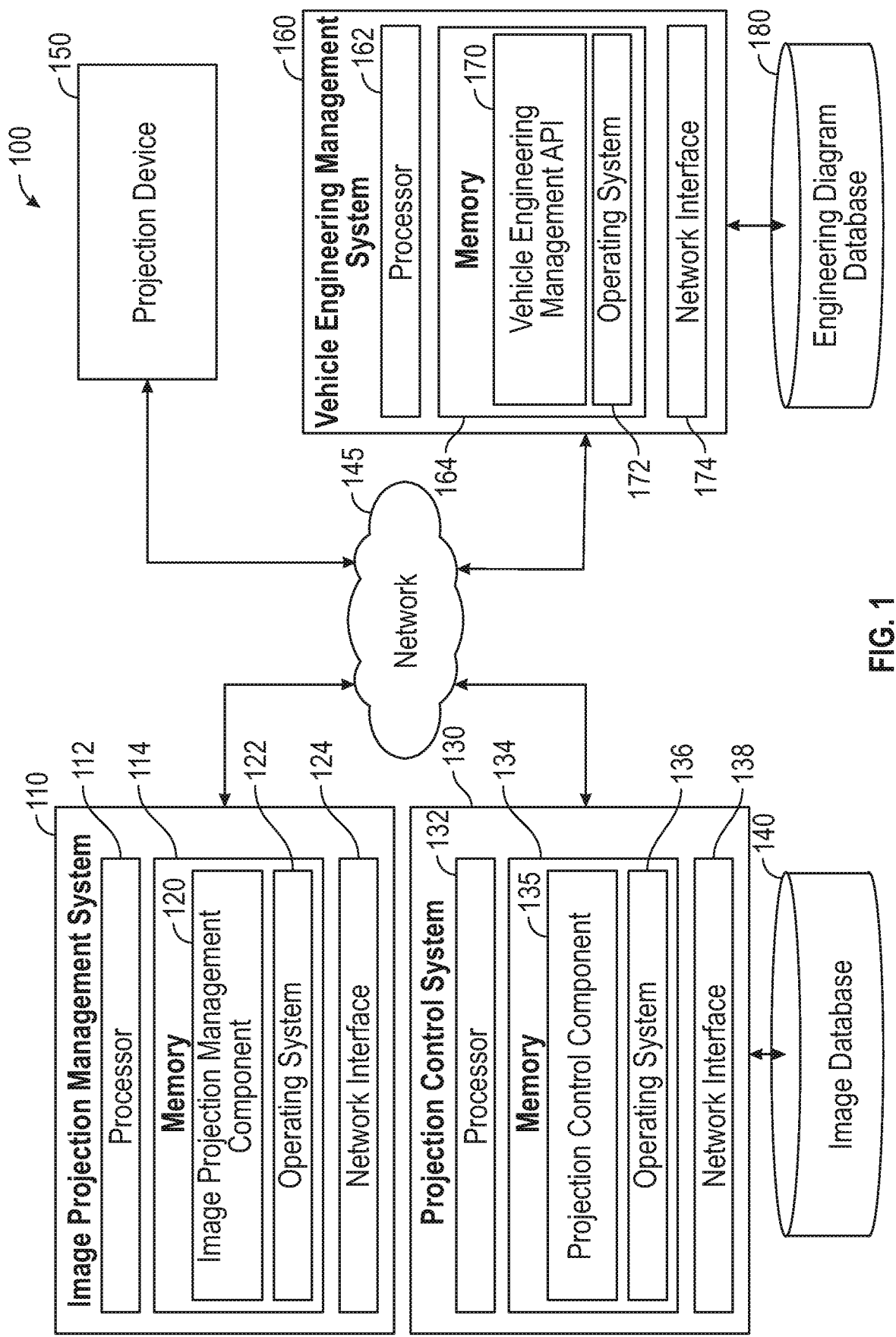
FIG. 1 is a block diagram illustrating a system that includes an image projection management component, according to one embodiment of the present disclosure.

In many instances, it would be desirable to project images or frames of video data onto a particular surface. For example, an advertisement, a safety demonstration video, a video feed of a live sporting event, and so on could all be desirable to project onto a surface (e.g., a surface within an aircraft). However, it is not always feasible to use an optimized projection screen, and this is particularly true in highly controlled and constrained environments such as an aircraft. Typically, the interiors of an aircraft have several curved surfaces like over-head cabin doors and curved ceiling. However, due to the shapes of these surfaces, the potential projector mounting locations, and the location of viewers (e.g., aircraft passengers), conventional projection techniques produce visual distortion when used to project images (e.g., still images, frames of video data, etc.) onto such surfaces. Embodiments described herein provide techniques for realizing distortion free projection onto curved surfaces.

Digital projectors can convert digital videos and images into optical information, which can then be projected onto a projection surface for human viewing. Generally, there are two types of distortions in projected images: geometric distortion and keystone distortion. Typically, straight lines are not preserved in geometric distortion, but may be preserved in keystone distortion. For example, curvature, bumps, or dents on the projection surface can cause geometric distortion, while the relative positioning of the projector, surface and viewer can cause keystone distortion when viewed from a position other than from the projector's field of view (FoV). While projection onto flat surfaces typically does not induce geometric distortion in the projected image, projection onto curved surfaces can induce geometric and keystone distortions in the projected image when viewed from a position other than from the projector's FoV.

Embodiments described herein provide techniques for warping images to be projected onto a fabricated surface based in part on engineering diagrams defining the shape of the fabricated surface. For example, such engineering diagrams can include computer-aided design (CAD) drawings, such as an STL file (or a stereolithography file, also referred to as a "Standard Triangle Language" and "Standard Tessellation Language" file) that defines the surface geometry of the fabricated surface. Embodiments generally provide techniques for altering an original image, such that a projection of the altered image onto the given curved surface appears distortion free from a particular viewpoint. For example, embodiments can alter the original image using warp transformation information to generate a transformed image and the transformed image can then be projected onto the fabricated surface. By generating warp transformation information based on a simulation of the projection process, embodiments obviate the need for physically projecting the original image/video onto the fabricated surface during the generation of the warp transformation image.

One embodiment described herein uses a machine-readable engineering diagram of the curved surface to compute the image warp parameters without the need for physical calibration. Embodiments generally can support in-line correction and offline correction of original images and video data, as the image warp parameters for a given projection device onto a given fabricated surface can be calculated once and then the calculated matrix can be used for every image and frame of video data to be projected onto the fabricated surface using the projection device. Particular embodiments can be extended for computing image warp parameters when multiple projectors project onto a given curved surface without the need for physical calibration.

FIG. 1 is a block diagram illustrating a system that includes an image projection management component, according to one embodiment of the present disclosure. As shown, the system 100 includes an image projection management system 110, a projection control system 130, a projection device 150 and a vehicle engineering management system 160, all interconnected by a network 145. The projection control system 130 is connected to an image database 140. Similarly, the vehicle engineering management system 160 is connected to an engineering diagram database 180. Generally, the image database 140 and the engineering diagram database 180 can execute on the projection control system 130 and the vehicle engineering management system 160, respectively, or can execute on a connected system (e.g., a computing system connected over a data communications network).

In one embodiment, the projection device 150 represents an optical device for projecting an image or video onto a surface. Many such projectors create an image by shining a light through a small transparent lens, while some newer types of projectors can project the image directly, by using lasers. Many commercial, off-the-shelf (COTS) projectors have a variety of physical models. In one embodiment, the projection device 150 comprises a normal-throw projector, which typically uses a Digital Micromirror Device (DMD) to reflect pixel information from an internal light source through a lens onto a projection surface. Another embodiment includes a projection device 150 that is an ultra-short-throw projector, which additionally uses a series of refractive lens and an odd polynomial mirror surface to enlarge the projection rapidly with respect to distance from the screen. Despite such variety of physical models for projectors, the image projection management component 120 can generalize projector optics within a simulation using a simplified pin-hole projector model.

Generally, a pin-hole projector is a simplification of the physical optics of a projector with point (pin-hole) and an image plane. In such a model, a light source (lamp) can shine light on the actual image plane ($P_A$) containing the content (vertically inverted) to be projected. Generally, for each point on $P_A$, only a single ray of light passes through the pin-hole. In other words, the pin-hole allows only one ray per point to pass through it. When these rays hit the similar image plane ($P_S$), they form the same image (vertically upright). It is possible to imagine that without a pin-hole the light from every point on $P_A$ would reach every point on $P_S$, resulting in an average image of uniform intensity on $P_S$ instead of a sharp image. In fact, if we increase the size of the pin-hole to any size other than the size of a point, we find that we obtain a blurred image on $P_S$ for the image on $P_A$ depending on the size of the pin-hole. This means that there is no blur with pin-hole projector regardless of the configuration of projector with respect to the surface. However, in real world, it is impractical to use a pin-hole for building projectors because the projection will not be bright enough (due to the use of only one ray per point). As such, conventional projection devices 150 compensate the increase in size of the pin-hole with optical lenses for focusing light on the screen to project brightly on the screen.

Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 112, processor 132, and processor 162 connected to, respective, a memory 114, memory 134 and memory 164 (e.g., a Random Access Memory (RAM) device, a storage device, etc.).

The processor 112, processor 132, and processor 162 each generally represent any piece of computer hardware that is capable of processing information such as, for example, data, computer programs and/or other suitable electronic information. The processor 112, processor 132, and processor 162 are each composed of a collection of electronic circuits some of which may be packaged as an integrated circuit or multiple interconnected integrated circuits (an integrated circuit at times more commonly referred to as a "chip"). The processor 112, processor 132, and processor 162 may be configured to execute computer programs, which may be stored onboard the processor or otherwise stored in the memory 114, memory 134 and memory 164 (of the same or another apparatus).

The processor 112, processor 132, and processor 162 may each represent a number of processors, a multi-processor core or some other type of processor, depending on the particular implementation. Further, the processor 112, processor 132, and processor 162 may be implemented using a number of heterogeneous processor systems in which a main processor is present with one or more secondary processors on a single chip. As another illustrative example, the processor 112, processor 132, and processor 162 may be a symmetric multi-processor system containing multiple processors of the same type. In yet another example, the processor 112, processor 132, and processor 162 may be embodied as or otherwise include one or more application-specific integrated circuits (ASICs), field-programmable gate arrays (FPGAs) or the like. Thus, although the processor 112, processor 132, and processor 162 may be capable of executing a computer program to perform one or more functions, the processor of various examples may be capable of performing one or more functions without the aid of a computer program.

The memory 114, memory 134 and memory 164 generally represent any piece of computer hardware that is capable of storing information such as, for example, data, computer programs (e.g., computer-readable program code) and/or other suitable information either on a temporary basis and/or a permanent basis. The memory 114, memory 134 and memory 164 may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), digital versatile disk (DVD), or the like. In various instances, the memory 114, memory 134 and memory 164 may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 114, memory 134 and memory 164, the processor 112, processor 132, and processor 162 may also be connected to one or more interfaces for displaying, transmitting and/or receiving information. The interfaces may include a communications interface (e.g., communications unit) and/or one or more user interfaces one example of which may be the network interface 124. The network interface 124 may be configured to transmit and/or receive information, such as to and/or from another apparatus(es), network(s) or the like. The network interface 124 may be configured to transmit and/or receive information by physical (wired) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

The memory 114, memory 134 and memory 164 contain, respectively, operating system 122, operating system 136 and operating system 172. Generally, the operating system 122, operating system 136 and operating system 172 each represent software that is configured to manage computing hardware and software resources on the image projection management system 110, projection control system 130 and vehicle engineering management system 160, respectively. The operating system 122, operating system 136 and operating system 172 may further provide computing services for software applications executing on the image projection management system 110, the projection control system 130, and the vehicle engineering management system 160.

As shown, the memory 114 includes an image projection management component 120. Generally, the image projection management component 120 is configured to generate warp transformation information (e.g., a warp transformation matrix) for use in transforming images to be projected onto a fabricated surface using projection device 150, such that the projected images can be viewed from a defined viewpoint substantially without visual distortion (e.g., keystone distortion, geometric distortion, etc.). For instance, in one embodiment, the image projection management component 120 could retrieve one or more electronic files containing an engineering diagram that describes a three-dimensional shape of a fabricated surface. For example, the image projection management component 120 could transmit a query to the vehicle engineering management system 160, requesting the engineering diagram for a particular fabricated surface. The vehicle engineering management Application Programming Interface (API) 170 could receive the request and could transmit a query to the engineering diagram database 180 to retrieve the requested engineering diagram (e.g., a computer-aided design (CAD) file containing stereolithography (STL) data.

The image projection management component 120 could then calculate warp transformation information for transforming images to be projected onto the fabricated surface, based on the engineering diagram and positional information defining a three-dimensional position of a projection device, relative to the fabricated surface. In one embodiment, the image projection management component 120 is configured to generate a warp transformation matrix that, when applied to an image (a single image, a frame of video data, etc.), transforms the image such that when the transformed image is projected, the projected image can be viewed from a defined viewpoint substantially without any visual distortion.

For example, in one embodiment, the image projection management component 120 is configured to generate a three-dimensional virtual representation of the fabricated surface, using the engineering diagram. For instance, the engineering diagram could define a three-dimensional shape of a surface of the fabricated surface. The image projection management component 120 could project a plurality of rays through a projector plane for the projection device onto the three-dimensional virtual representation of the fabricated surface. Advantageously, by projecting points onto the virtual surface generated using the engineering diagram, the image projection management component 120 can generate the warp transformation information for a given projection device and a given fabricated surface through a computerized simulation and without requiring images to be projected onto a physical surface using a physical projection device.

Additionally, the image projection management component 120 could determine, for each of the plurality of rays, a respective point on a camera plane for a virtual camera device that the respective ray intersects. The image projection management component 120 could then generate a bijective mapping for each point on the projector plane onto each point in the camera plane. In other words, the image projection management component 120 can generate a mapping of feature points from points in the original image to points in the observed image from a given viewpoint. The image projection management component 120 can then generate warp transformation information that can be applied to images, such that when the transformed mages are projected onto the fabricated surface using the projection device, the projected images will have substantially the same appearance as the original image when viewed from a given viewpoint.

The generated warp transformation information could then be provided to the projection control component 135, which is executing on the projection control system 130 (e.g., aboard an aircraft, together with the projection device 150). The projection control component 135 could receive one or more images to project onto the fabricated surface. For example, the projection control component 135 could retrieve the one or more images from the image database 140. In one embodiment, the image database 140 is hosted by a database management system that executes on a computing system deployed aboard the aircraft. In a particular embodiment, an aircraft can be configured with a plurality of projection devices 150, each configured to project an image(s) onto a respective fabricated surface within the aircraft and each having a corresponding projection control component 135. In such an embodiment, warp transformation information can be generated and provided to the projection control component 135 for each projection device 150 and corresponding fabricated surface aboard the aircraft.

The projection control component 135 can then apply the warp transformation information to the one or more images to generate one or more transformed images. The projection control component 135 can project, using the corresponding projection device 150, the one or more transformed images onto the fabricated surface. Advantageously, by doing so, the projected transformed images will be substantially identical in appearance to the original image being projected when the projected transformed images are viewed from a corresponding viewpoint. In one embodiment, the corresponding viewpoint corresponds to a central point in a block of seats proximate to the fabricated surface aboard the aircraft.

Figure 2:
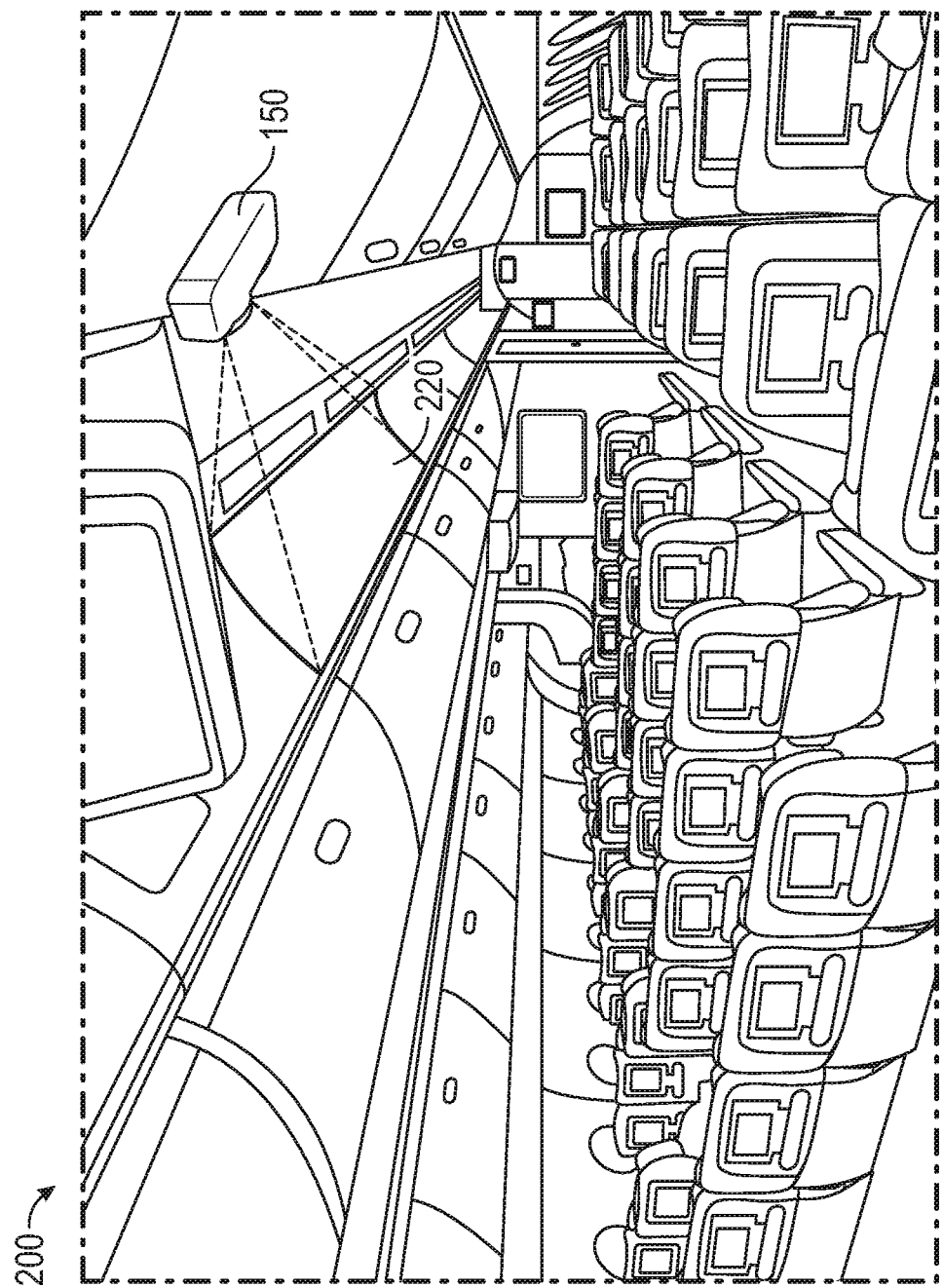
FIG. 2 illustrates an aircraft cabin configured with a projection device, according to one embodiment of the present disclosure.

An example of such an aircraft is shown in FIG. 2, which illustrates an aircraft cabin configured with a projection device, according to one embodiment of the present disclosure. As shown, the aircraft cabin 200 depicts a projection device 150, that is configured to project an image(s) onto a fabricated surface 220 aboard the aircraft. Generally, the projection device 150 can be mounted in a location that is hidden (or substantially hidden from view) and that has an unobstructed light of sight to the fabricated surface 220. The projection device 150 can generally be any sort of projection device (e.g., a normal throw projector, a short thrown projector, etc.). In one embodiment, the projection device 150 has a fixed location relative to the fabricated surface 220, and this positional information can be provided to the image projection management component 120 for use in generating the warp transformation information.

On-board Projection Systems (OPS), such as the projection device 150, are being developed for the upcoming aircrafts, and such system can be retrofitted onto existing aircraft. Generally, such projection systems can transform inanimate surfaces within an airplane into presentation surfaces. OPS have many applications onboard aircrafts, including (without limitation) mood enabling, onboard passenger information, advertisement, and infotainment. While a number of conventional solutions exist for projecting onto flat surface or uniformly curved, projection-optimized surfaces, such solutions are not suitable for projecting onto arbitrarily curved and non-uniform surfaces.

The image projection management component 120 can take into account a number of factors in computing the warp transformation information for warping images that will be projected by the projection device 150 onto the fabricated surface 220. The image projection management component 120 could consider, for example and without limitation, a digitized engineering diagram of the projection surface represented as a CAD file (e.g., retrieved by the image projection management component 120 by querying the vehicle engineering management API 170, which in turn retrieves the CAD file from the engineering diagram database 180). Additionally, the image projection management component 120 can take into account the location of the viewer relative to the projection surface 220. For example, the viewer location can be defined as a particular location within the aircraft (e.g., a central location in a block of seats proximate to the projection surface 220). The image projection management component 120 could also consider metadata describing the projection device 150, such as intrinsic and extrinsic metadata of the projection device 150, e.g., throw (e.g., short-throw, normal-throw, etc.), mounting location, pose/orientation of projector, etc. The image projection management component 120 can further consider the up-vector of the scene that includes the projector, surface and the viewer.

Based on these inputs, the image projection management component 120 can determine how to warp input images/videos, which are to be projected onto the fabricated surface 220 using the projection device 150, such that the projected images/videos appear similar to the input images/videos when viewed from the location of the viewer. In doing so, the image projection management component 120 can use simulation-based software for configuring the curved surface for a given configuration of projector and viewer. Moreover, by doing so, the image projection management component 120 can determine the warp transformation information in a manner that does not use any special on-board sensors or experimentation aboard the aircraft to configure the projectors vis-à-vis the surface and the location of intended viewers. Additionally, the image projection management component 120 is capable of calculating warp transformation information that can support the warping of images/videos in offline as well as near-real-time manner. For example, an entire digital video file could be processed, such that frames within the digital video file are transformed to be optimally projected onto the fabricated surface 220. As another example, the image projection management component 120 can apply the warp transformation information to images (e.g., frames of video data) in real-time, e.g., through the use of a graphics processing unit optimized for applying the warp transformation. Such an embodiment can be used to, for example, to transforms frames of a live video feed (e.g., a live sporting event) in substantially real-time, and the transformed frames can then be projected onto the projection surface and viewed from the corresponding viewpoint with substantially no visual distortion.

Figure 3:
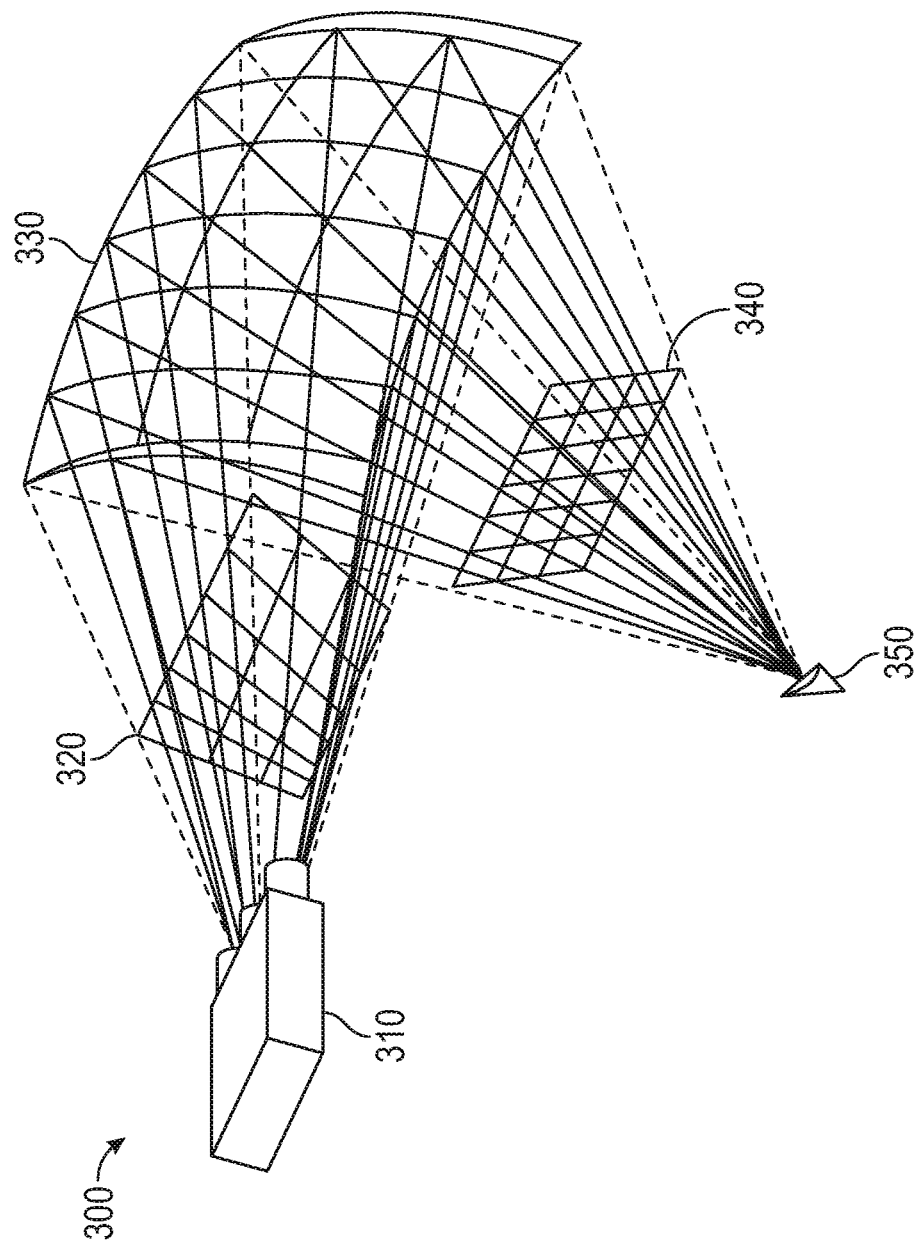
FIG. 3 illustrates the projection of an image onto a curved projection surface, according to one embodiment of the present disclosure.

FIG. 3 illustrates the projection of an image onto a curved projection surface, according to one embodiment of the present disclosure. As shown, the illustration 300 includes an off-center projection device 310 that is projecting an image onto a curved surface 330, which are then viewed by an off-center viewer 350. In the depicted example, the projected points pass through a projection plane 320, and similarly the viewed points pass through a camera plane 340.

As discussed above, the image projection management component 120 can consider various pieces of information, such as the three-space location of the projection device, in generating warp transformation information to be applied to images that will be projected. In one embodiment, the projection device location is a point (P) in the 3D coordinate frame of the CAD diagram. The methodology for locating P in the physical environment, which is modelled in the CAD diagram, differs for normal-throw and ultra-short-throw projectors as described below. Note that the pin-hole model is independent of the type of projector employed.

In one embodiment, when calculating the projection device location for a normal-throw projector, the coordinate of the center of visible lens of the projector can be used as a measure of P with respect to CAD coordinate frame. On the other hand, in an embodiment where a short-throw projection device is used, the image projection management component 120 generally will not use the coordinate of the center of visible lens of the projector as a measure of P with respect to CAD coordinate frame. Instead, the image projection management component 120 can use indirect measurement techniques to localize point P. The reason is short-throw projector is highly sensitive to its placement with respect to the surface, therefore accurate localization of P is critical to correct warp transformation in simulation.

In one embodiment, the image projection management component 120 is configured to create a black image with two white points. In a particular embodiment, the white dots are located at the center-bottom and center-top of the image, respectively. The white dots can also be located at any other place in the image. However, in one embodiment, it is optimal for the white dots to be located on the center vertical line as the problem of identifying P in 3D can be reduced to a 2D problem.

The image projection management component 120 can project this image from the projector on a flat screen, such that the projection is rectangular and sharp. The locations of the projected white dots can be noted down from a reference base such as the floor ($W_{11}$ and $W_{21}$). This information can be referred to as the first reading. The projection screen can then be moved towards the projector or away from the projector such that the new orientation of the screen is parallel to the old orientation and the projection is still rectangular. If the projection is not sharp anymore, then the focusing knob on the projector can be adjusted to create a sharp in-focus projection. The locations of the two white dots can again be noted ($W_{12}$ and $W_{22}$). Embodiments can then create two straight lines joining these two sets of points (Line 1: $W_{11}$, $W_{12}$ and Line 2: $W_{21}$, $W_{22}$). Point P can then be calculated as the intersection of the two lines. Of note, the point P in such an embodiment may be located outside the body of the projector itself. This is indeed possible because light is reflected from a free-form mirror and if the rays are produced backwards then intersection of rays can go outside the projector's body.

Figure 4:
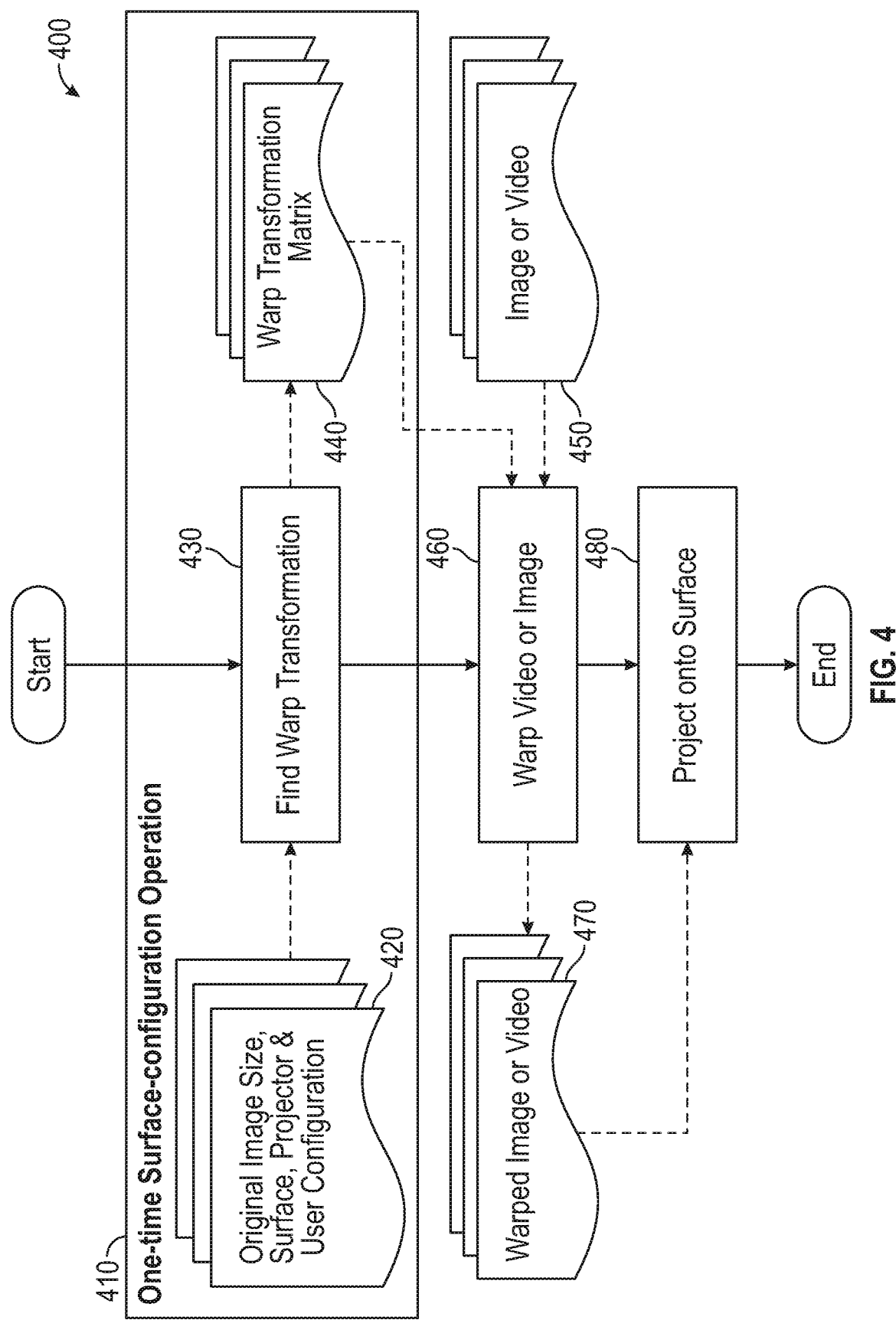
FIG. 4 illustrates a method of projecting a warped image onto a fabricated surface, according to one embodiment of the present disclosure.

FIG. 4 illustrates a method of projecting a warped image onto a fabricated surface, according to one embodiment of the present disclosure. As shown, the method 400 begins where data parameters (block 420) such as an original image size, surface information, projector information, user configuration information and so on is provided to the image projection management component 120 for use in finding the warp transformation (block 430) to be applied to images that are to be projected onto a fabricated surface.

Additionally, an engineering diagram can be provided to the image projection management component 120 for analysis in generating the warp transformation information. For example, a STL CAD file could be provided to the image projection management component 120, where the StereoLithography file consists of many 2D planar polygons/faces (generally triangles) connected together to form a 3D surface. In a particular embodiment, the image projection management component 120 is configured to use a STP file, which is another format which stores the 3D model parametrically but we require STL format of the surface because the algorithm uses polygonal information available in the STL file to generate warp transformation. More generally, any three-dimensional surface model of the fabricated surface can be used, consistent with the functionality described herein.

The image projection management component 120 can then synthesize the various inputs discussed above to generate the warp transformation matrix (block 440), for use in transforming images to be projected onto a particular fabricated surface. Of note, blocks 420, 430 and 440 in the depicted embodiment are performed as part of a one-time surface-configuration operation 410. In one embodiment, the image projection management component 120 is configured to perform the surface configuration operation 410 for each projection device and each corresponding fabricated surface (e.g., aboard a particular model of aircraft).

Subsequently, an image or frame of video data (block 450) is provided to the projection control component 135 for a given projection device and a given fabricated surface. For example, such an image or video data could be transmitted to the projection control component 135 from a media control server aboard an aircraft. Using the warp transformation matrix (generated at block 440), the image or frame of video data (provided at block 450) is warped (block 460) to produce a transformed image (block 470). The projection control component 135 then projects the transformed images onto the fabricated surface (block 480), and the method 400 ends.

Figure 5:
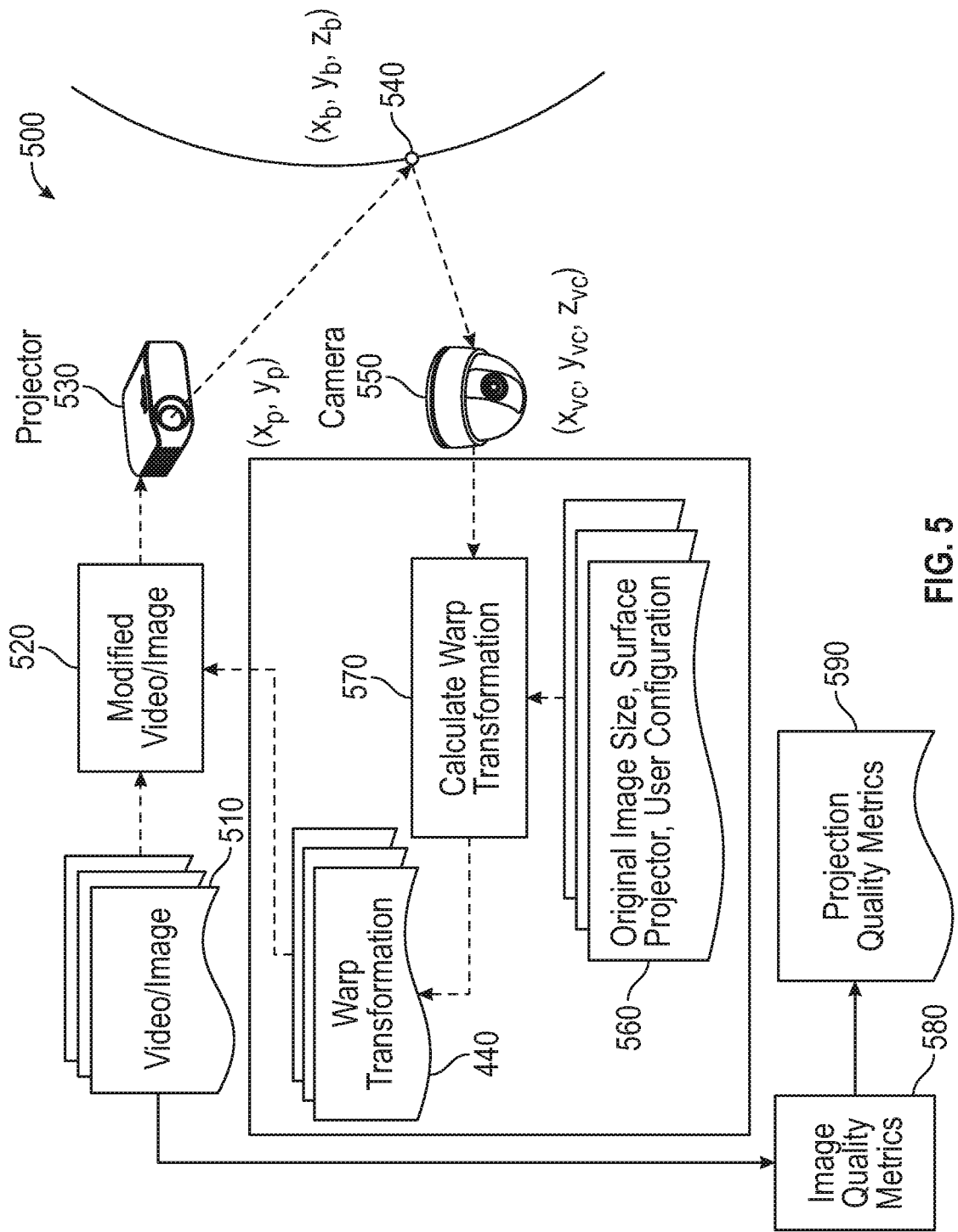
FIG. 5 illustrates a method for calculating warp transformation information by simulating projection of an image onto a virtual surface defined by an engineering diagram, according to one embodiment of the present disclosure.

FIG. 5 illustrates a method for calculating warp transformation information by simulating projection of an image onto a virtual surface defined by an engineering diagram, according to one embodiment of the present disclosure. As shown in the method 500, the image projection management component 120 receives an image or frame of video data for simulated projection (block 510). The image projection management component 120 can modify the image or frame of video data (block 520) and can project the modified image onto a virtual three-dimensional surface 540, using projector 530. A virtual camera 550 is used to determine a viewable image of the projected image.

The image projection management component 120 can then calculate a warp transformation (block 570), based on the viewable image, the original image projected and other data (block 560). Such other data can include, for example, a size of the original image, data describing the surface onto which the image is projected, projector information (e.g., a resolution of the projector, whether the projector is a normal throw projector or a short throw projector, etc.) and so on. The resulting warp transformation (block 440) can then be applied to the original image (or to a different image) (block 520), which is then re-projected onto the surface 540. The virtual camera 550 can again generate a viewable image of the projected image, and the warp transformation information can be refined based on differences between the original projected image and the viewable image. To this end, the image projection management component 120 can collected image quality metrics 580 and can use such metrics to calculate projection quality metrics 590.

Figure 6:
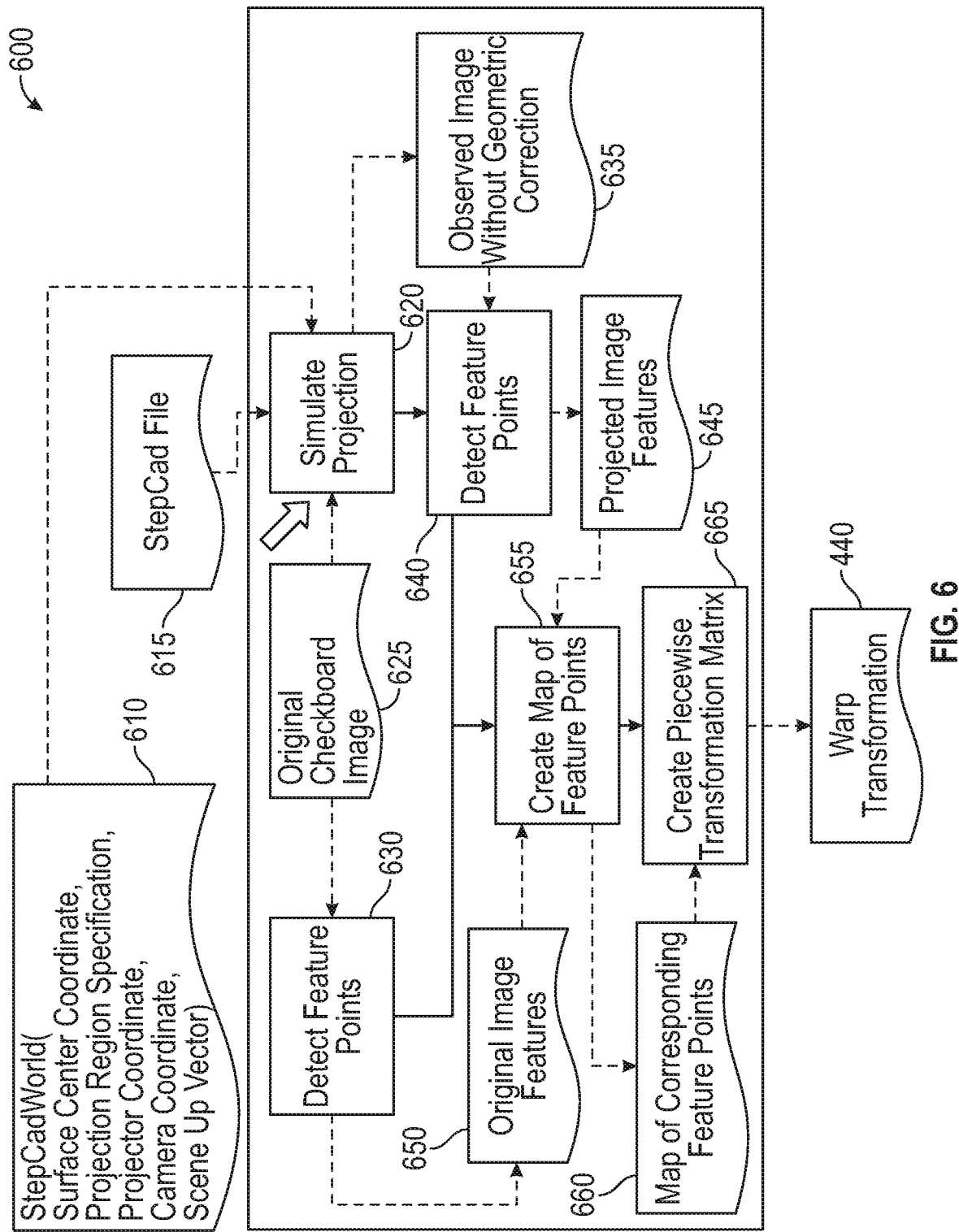
FIG. 6 illustrates a method for calculating warp transformation information by mapping feature points from a simulated projection of an image onto the original image, according to one embodiment of the present disclosure.

FIG. 6 illustrates a method for calculating warp transformation information by mapping feature points from a simulated projection of an image onto the original image, according to one embodiment of the present disclosure. As shown, the method 600 begins at block 610, where various pieces of data and metadata are collected for use in simulating an image projection. Such data can include, for example, surface center coordinate information, projection region information, projector positional coordinate information, camera coordinate information, scene up vector information, and so on.

The image projection management component 120 simulates a projection of an image 625 using the collected information (block 620). An observed image without geometric correction is captured (block 635) using a virtual camera device, and the image projection management component 120 detects features (block 645) within the observed image (block 640). Similarly, the image projection management component 120 detects feature points (block 650) within the originally projected image (block 630), and the image projection management component 120 creates (block 655) a mapping of feature points between the features for the originally projected image and the features for the observed image (block 660). Additionally, the image projection management component 120 can generate a piecewise transformation matrix (block 665) based on the feature mapping.

Once the warp transformation matrix is generated, the projection control component 135 (e.g., executing on a computing system aboard an aircraft) can use the warp transformation matrix to apply a warp transformation to an image to be projected onto a fabricated surface (block 440). The transformed image can then be projected using a projection device onto a fabricated surface. Advantageously, by transforming the image prior to projection using the techniques described herein, embodiments can substantially eliminate any visual distortion (e.g., keystone distortion, geometric distortion, etc.) when the projected image is viewed from a particular viewpoint.

Figure 7:
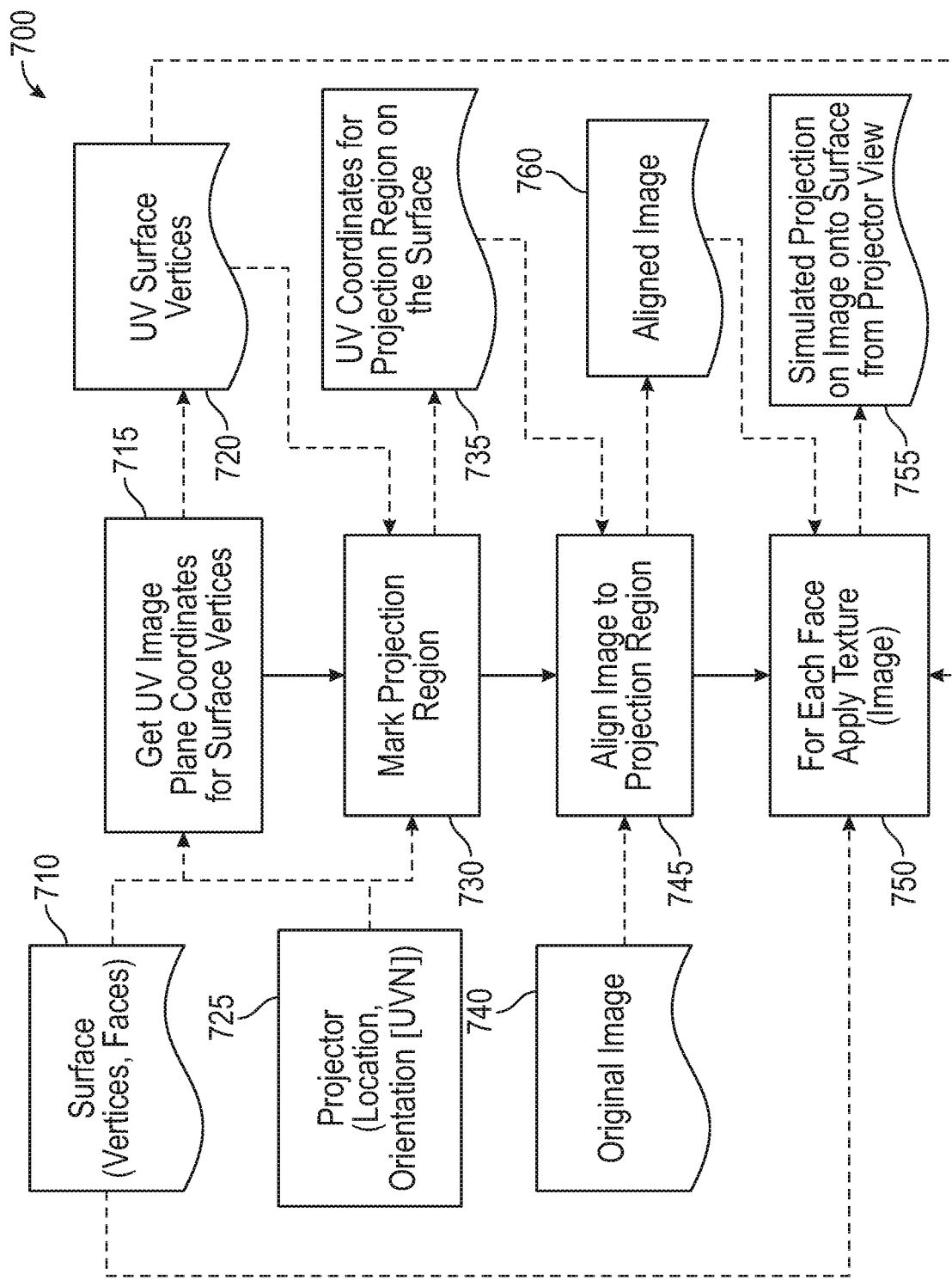
FIG. 7 illustrates a method for simulating projection of an image onto a fabricated surface, according to one embodiment of the present disclosure.

FIG. 7 illustrates a method for simulating projection of an image onto a fabricated surface, according to one embodiment of the present disclosure. As shown, the method 700 begins at block 710, where the image projection management component 120 gathers surface information (e.g., surface vertices, surface faces, etc.) for the fabrication surface onto which the image is being projected. In doing so, the image projection management component 120 can determine such surface information by analyzing the engineering diagram provided for the fabricated surface.

The image projection management component 120 determines UV image plane coordinates (where "U" and "V" denote axes) for surface vertices (block 720) of the fabricated surface (block 715). Additionally, the image projection management component 120 collects information about the projection unit being used to project the images (block 725). For example, such information can include positional information of the projector relative to the fabricated surface, pose/orientation information of the projector, and so on. The image projection management component 120 marks a projection region on the fabricated surface (block 730). For example, the image projection management component 120 could provide a graphical user interface through which a user can specify a bounding box that defines a projection region on the fabricated surface. The image projection management component 120 then determines UV coordinates for the projection region on the fabricated surface (block 735).

The image projection management component 120 retrieves an original image for projection (block 740) and aligns the image to the defined projection region on the fabricated surface (block 745) to produce an aligned image (block 760). For each surface face of the fabricated surface, the image projection management component 120 applies texture information (block 750). For example, such texture information could be determined from the engineering diagram for the fabricated surface. The image projection management component 120 then simulates a projection of the image onto the fabricated surface (block 755). By simulating projection of the image onto the fabricated surface, the image projection management component 120 can determine warp transformation information for eliminating distortion from projected images for a given surface, without requiring actual projection and/or testing with the physical surface.

Figure 8:
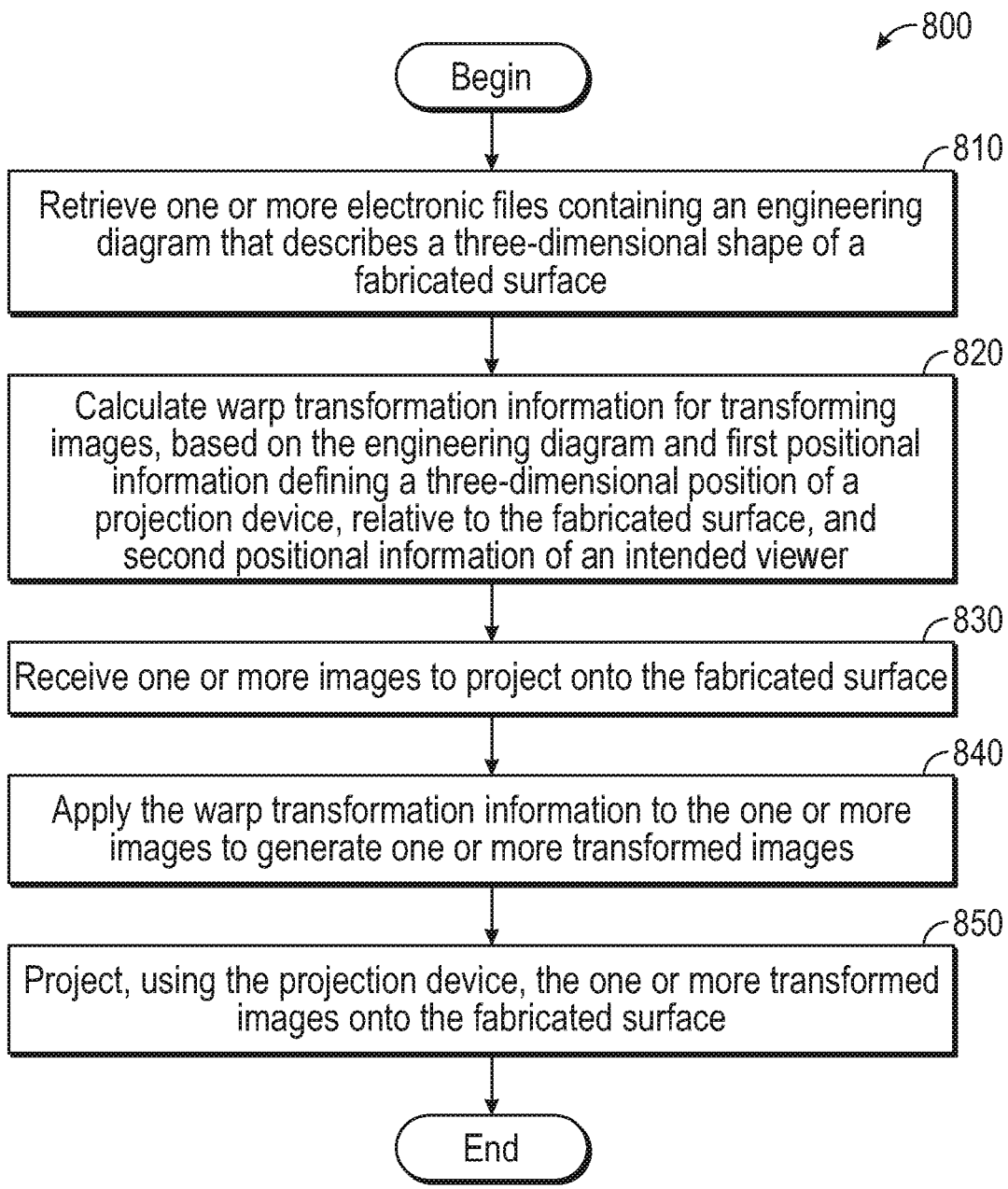
FIG. 8 illustrates a method for projecting a warped image onto a fabricated surface, according to one embodiment described herein.

FIG. 8 illustrates a method for projecting a warped image onto a fabricated surface, according to one embodiment described herein. As shown, the method 800 begins at block 810, where the image projection management component 120 retrieves one or more electronic files containing an engineering diagram that describes a three-dimensional shape of a fabricated surface. The image projection management component 120 calculates warp transformation information for transforming images to be projected onto the fabricated surface, based on the engineering diagram and positional information defining a three-dimensional position of a projection device, relative to the fabricated surface (block 820).

The projection control component 135 can receive one or more images to project onto the fabricated surface (block 830). The projection control component 135 can then apply the warp transformation information to the one or more images to generate one or more transformed images (block 840). The projection control component 135 can project, using the projection device, the one or more transformed images onto the fabricated surface (block 850), and the method 800 ends.

Figure 9:
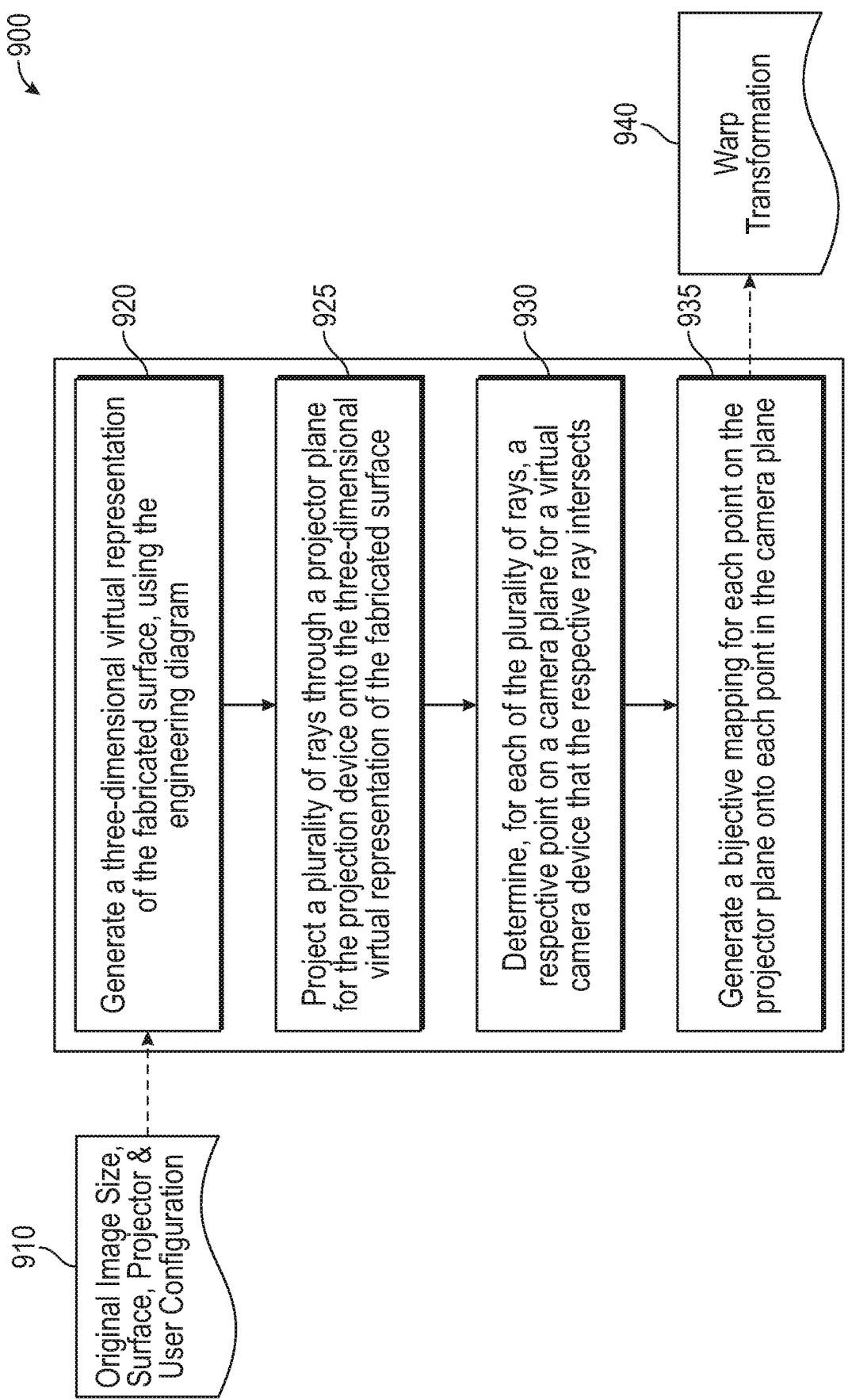
FIG. 9 is a flow diagram illustrating a method for generating warp transformation information, according to one embodiment described herein.

FIG. 9 is a flow diagram illustrating a method for generating warp transformation information, according to one embodiment described herein. As shown, the method 900 begins at block 910, where the image projection management component 120 retrieves data specifying an original image size, an engineering diagram and/or data describing the fabricated surface to be project onto using a projection device, data describing the projection device, user configuration data and/or other data for use in generating warp transformation information for transforming an image to be projected. The image projection management component 120 generates a three-dimensional virtual representation of the fabricated surface, using the engineering diagram (block 920).

The image projection management component 120 projects a plurality of rays through a projector plane for the projection device onto the three-dimensional representation of the fabricated surface (block 925). For each of the projected rays, the image projection management component 120 determines a respective point on a camera plane for a virtual camera device that the respective ray intersects (block 930). For example, the virtual camera device could be positioned at a three-dimensional point corresponding to a position of an intended viewer of the projected image, as defined by the retrieved user configuration data. The image projection management component 120 generates a respective bijective mapping for each point on the projector plane onto each point in the camera plane (block 935). The image projection management component 120 can then aggregate the generated bijective mappings to form the warp transformation information (block 940).

Figure 10A:
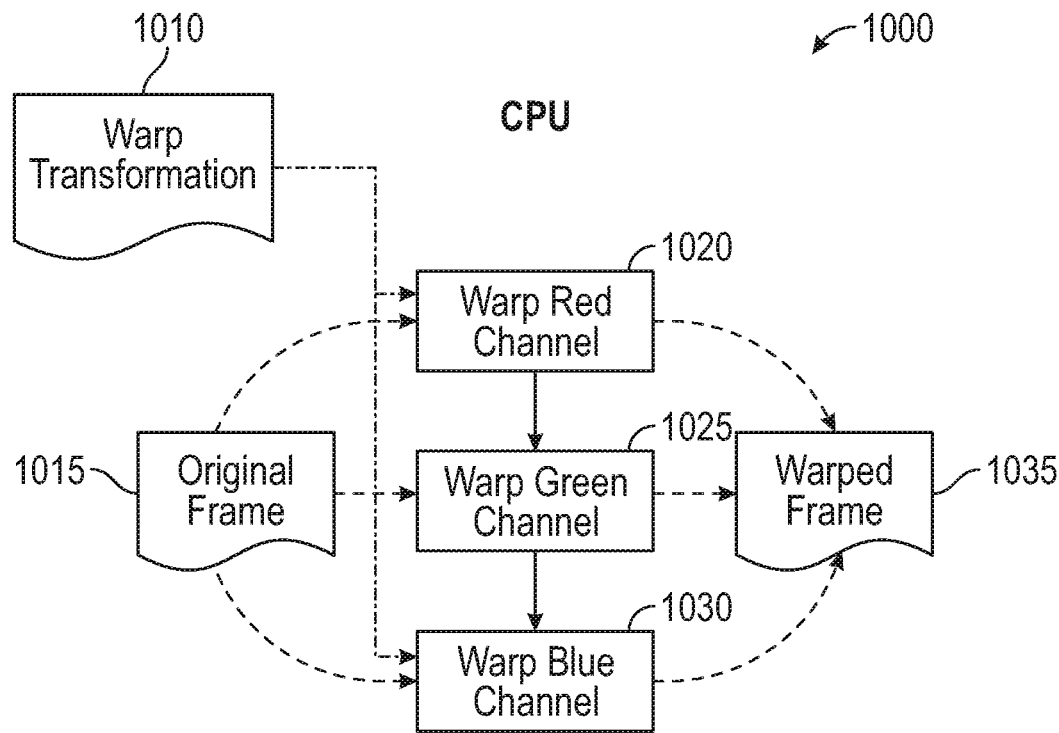
FIGS. 10A-B are flow diagrams illustrating a method for processing an original frame of video data to produce a warped frame of video data for projection on a fabricated surface, according to one embodiment described herein.
Figure 10B:
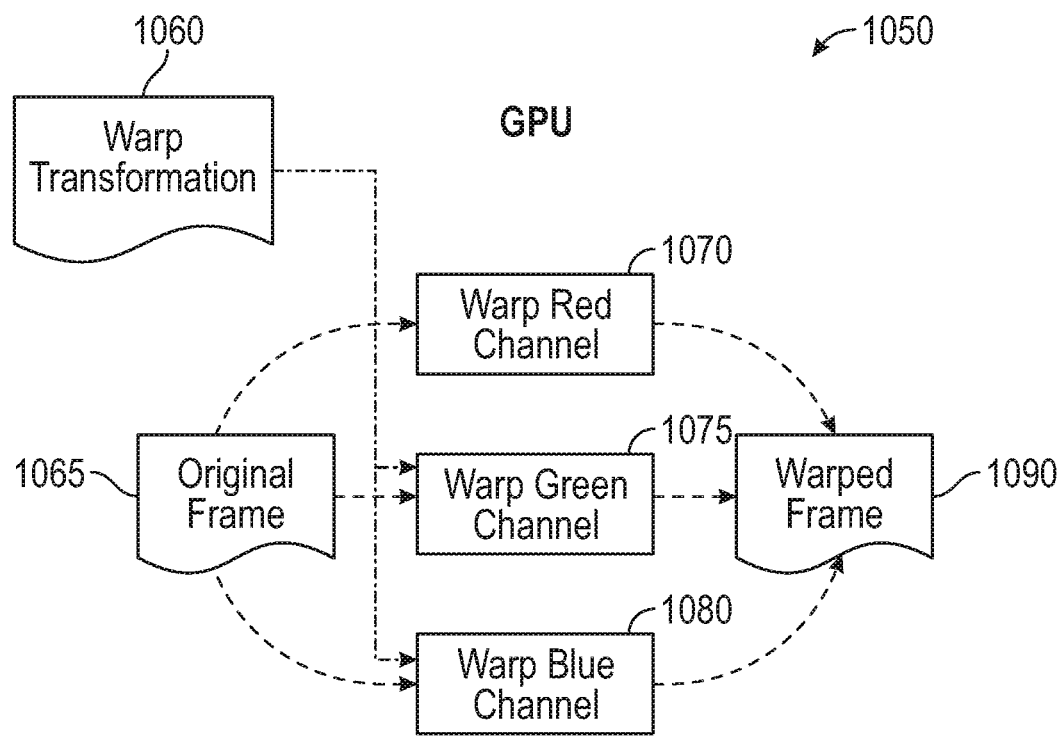

FIGS. 10A-B are flow diagrams illustrating a method for processing an original frame of video data to produce a warped frame of video data for projection on a fabricated surface, according to one embodiment described herein. As shown, FIG. 10A is a block diagram that depicts a method 1000, in which the image projection management component 120 receiving warp transformation information 1010 and an original frame of video data 1015 as inputs. In the depicted embodiment, the image projection management component 120 applies warp transformations on pixel data within the original frame 1015 on the red color channel (block 1020), the green color channel (block 1025) and the blue color channel (block 1030), using the warp transformation information 1010 and by operation of a CPU device. The result of the warp transformation operations on the red 1020, green 1025 and blues 1030 channels within the original frame 1015 is the warped frame of image data 1035. Advantageously, the warped frame of image data 1035 can then be projected using the corresponding projection device (i.e., the projection device the warp transformation information 1010 corresponds to), so that the projected image will appear substantially without visual distortion when viewed from a defined user viewpoint.

Generally, when the method 1000 is performed using a conventional CPU device, such a CPU device may not be capable of transforming the original frames of video data in real-time. That is, the playback rate of the frames of video data may exceed the rate at which the image projection management component 120 is capable of transforming the frames of video data using a CPU device. As such, in the method 1000, the image projection management component 120 may be configured to store the warped frames of video data 1035 to a computer-readable storage medium in a suitable digital video format, and the transformed video data can then be retrieved subsequently for playback. For example, the warped frames of video data 1035 could be generated using one or more compute nodes in a cloud computing environment, and the resulting digital video file could be stored on a computer-readable storage medium onboard an aircraft. The resulting digital video file could then be retrieved and projected onto a fabricated surface within the aircraft using a projection device.

In a particular embodiment, a GPU device is used to transform frames of video data in real-time. Such an embodiment can be used, for example, to transform frames of video data for a live event (e.g., a sporting event, a royal wedding, etc.) in substantially real-time. As shown, FIG. 10B is a block diagram 1050 that depicts the image projection management component 120 receiving warp transformation information 1060 and an original frame of video data 1065 as inputs. In the depicted embodiment, the image projection management component 120 applies warp transformations on pixel data within the original frame 1065 on the red color channel (block 1070), the green color channel (block 1075) and the blue color channel (block 1080), using the warp transformation information 1060 and by operation of a GPU device. The result of the warp transformation operations on the red 1070, green 1075 and blues 1080 channels within the original frame 1065 is the warped frame of image data 1090. Advantageously, the warped frame of image data 1090 can then be projected using the corresponding projection device (i.e., the projection device the warp transformation information 1060 corresponds to), so that the projected image will appear substantially without visual distortion when viewed from a defined user viewpoint. Moreover, through the use of a GPU device, the image projection management component 120 can transform frames of video data in real-time.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1200 may include a processor 1202 and a computer-readable storage medium or memory 1204 coupled to the processor, where the processor is configured to execute computer-readable program code 1206 stored in the memory. It will also be understood that one or more functions, and combinations of functions, may be implemented by special purpose hardware-based computer systems and/or processors which perform the specified functions, or combinations of special purpose hardware and program code instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), an electronically erasable programmable memory (EEPROM) such as a flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
receiving one or more electronic files containing an engineering diagram relating to a surface;
parsing the one or more electronic files to determine a plurality of parameters describing a three-dimensional shape of the surface;
receiving first positional information describing a location of a projection device in three-dimensional space;
calculating warp transformation information for transforming a plurality of images for projection onto the surface, based on the determined plurality of parameters, the first positional information, and second positional information of an intended viewer relative to the surface, and further based on mapping a first image of the plurality of images with a simulated projection of the first image onto a virtual representation of the surface;

receiving one or more images to project onto the surface;

applying the warp transformation information to the one or more images to generate one or more transformed images; and projecting, using the projection device, the one or more transformed images onto the surface.

2. The method of claim 1, wherein the one or more images further comprise frames of video data.

3. The method of claim 1, wherein the simulated projection of the first image is based on the determined plurality of parameters and the first positional information defining the three-dimensional position of the projection device, relative to the surface.

4. The method of claim 1, wherein mapping the first image of the plurality of images with the simulated projection further comprises:

mapping a plurality of points between the first image and the simulated projection of the first image.

5. The method of claim 1, wherein the warp transformation information is applied to the one or more images to generate one or more transformed images in real-time using one or more graphics processing units (GPUs).

6. The method of claim 1, wherein the one or more images further comprise frames of video data, and further comprising generating a digital file that is formatted according to a predefined video encoding standard, wherein the digital file contains at least a representation of the transformed images generated from the frames of video data.

7. The method of claim 1, wherein the first positional information further defines a pose and an orientation of the projection device.

8. The method of claim 7, wherein the warp transformation information is applied to the one or more images to generate one or more transformed images, such that when the one or more transformed images are projected onto the surface using the projection device, the projected image is substantially similar in appearance to the one or more images when viewed from a location of the intended viewer.

9. The method of claim 1, wherein the projection device further comprises a normal-throw projection device, and wherein the first positional information further comprises three-dimensional coordinates defining a center of a visible lens of the normal-throw projection device.

10. The method of claim 1, wherein the first positional information is calculated using multiple different projector positions.

11. The method of claim 1, wherein calculating warp transformation information for transforming images to be projected onto the surface is further based on generating a three-dimensional virtual representation of the surface, using the engineering diagram.

12. The method of claim 11, wherein calculating warp transformation information for transforming images to be projected onto the surface, based on the determined plurality of parameters and first positional information defining a three-dimensional position of the projection device, relative to the surface further comprises:

receiving a selection of a bounding box that corresponds to a rectangular portion of a camera plane; and calculating the warp transformation information, based on the bounding box selection and one or more generated bijective mappings relating to a projector plane for the projection device and the camera plan.

13. A projection system, comprising:

one or more projection devices;

a non-transitory computer-readable medium containing electronic data corresponding to one or more images to project onto a surface and warp transformation information for transforming a plurality of images for projection onto the surface, wherein the warp transformation information is calculated based on a plurality of parameters describing a three-dimensional shape of the surface, first positional information describing one or more locations of the one or more projection devices in three-dimensional space, and second positional information of an intended viewer relative to the surface, and wherein the warp transformation information is further based on mapping a first image of the plurality of images with a simulated projection of the first image onto a virtual representation of the surface; and logic configured to:

parse one or more electronic files containing an engineering diagram, to determine the plurality of parameters describing the three-dimensional shape of the surface retrieve the electronic data corresponding to the one or more images to project onto the surface from the non-transitory computer-readable medium;

apply the warp transformation information to the one or more images to generate one or more transformed images; and project, using the one or more projection devices, the one or more transformed images onto the surface.

14. The projection system of claim 13, wherein the one or more images further comprise frames of video data.

15. The projection system of claim 13, wherein the simulated projection of the first image is based on the determined plurality of parameters and the first positional information defining the three-dimensional position of the one or more projection devices, relative to the surface; and wherein mapping the first image of the plurality of images with the simulated projection further comprises: mapping a plurality of points between the first image and the simulated projection of the first image.

16. The projection system of claim 13, wherein the warp transformation information for transforming images to be projected onto the surface is further based on generating a three-dimensional virtual representation of the surface, using the engineering diagram.

17. The projection system of claim 13, wherein the first positional information further defines a pose and an orientation of the one or more projection devices, and wherein the second positional information defines a location of the intended viewer.

18. The projection system of claim 17, wherein the warp transformation information is applied to the one or more images to generate one or more transformed images, such that when the one or more transformed images are projected onto the surface using the one or more projection devices, the projected image is substantially similar in appearance to the one or more images when viewed from the location of the intended viewer.

19. A non-transitory computer-readable medium containing computer program code that, when executed by operation of one or more computer processors, performs an operation comprising:

receiving one or more electronic files containing an engineering diagram relating to a surface;

parsing the one or more electronic files to determine a plurality of parameters describing a three-dimensional shape of the surface;

receiving first positional information describing a location of a projection device in three-dimensional space;

calculating warp transformation information for transforming a plurality of images for projection onto the surface, based on the determined plurality of parameters, the first positional information, and second positional information of an intended viewer relative to the surface, and further based on mapping a first image of the plurality of images with a simulated projection of the first image onto a virtual representation of the surface;

receiving one or more images to project onto the surface;

applying the warp transformation information to the one or more images to generate one or more transformed images; and projecting, using the projection device, the one or more transformed images onto the surface.

20. The method of claim 1, wherein the first positional information comprises one or more positional coordinates describing the location of the projection device.

* * * * *